US007222602B2

(12) United States Patent
Fukasawa

(10) Patent No.: US 7,222,602 B2

(45) Date of Patent: May 29, 2007

(54) FUEL INJECTION CONTROLLER FOR IN-CYLINDER INJECTION ENGINE

(75) Inventor: Osamu Fukasawa, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/412,208

(22) Filed: Apr. 27, 2006

(65) Prior Publication Data

US 2006/0243243 A1 Nov. 2, 2006

(30) Foreign Application Priority Data

Apr. 28, 2005 (JP) ............................ 2005-130999

(51) Int. Cl.
*F02B 3/00* (2006.01)
*F02B 5/00* (2006.01)

(52) U.S. Cl. ...................................... 123/299; 123/305

(58) Field of Classification Search ................ 123/299, 123/300, 305, 295, 430, 301
See application file for complete search history.

(56) References Cited

U.S. PATENT DOCUMENTS 6,240,724 B1 * 6/2001 Kudou et al. ................. 60/284
6,250,286 B1 * 6/2001 Hoenig et al. .............. 123/490
6,725,829 B2 * 4/2004 Kataoka et al. ............. 123/299
6,823,832 B2 * 11/2004 Henning et al. ............ 123/299
6,901,747 B2 * 6/2005 Tashiro et al. ................ 60/286
6,962,140 B1 * 11/2005 Nakai et al. ................ 123/436
6,964,256 B2 * 11/2005 Kataoka et al. ............. 123/295
7,055,495 B2 * 6/2006 Yamaoka et al. ........... 123/305
2001/0045200 A1 * 11/2001 Urushihara et al. ......... 123/295
2003/0145581 A1 * 8/2003 Tashiro et al. ................ 60/286
2003/0230276 A1 * 12/2003 Kataoka et al. ............. 123/295

FOREIGN PATENT DOCUMENTS

JP 2674445 7/1997
JP 3095085 8/2000
JP 3186373 5/2001

* cited by examiner

*Primary Examiner*—Mahmoud Gimie
(74) *Attorney, Agent, or Firm*—Nixon & Vanderhye P.C.

(57) ABSTRACT

A fuel injection controller of an in-cylinder injection engine determines that a combustion state has deteriorated and executes a split injection for injecting fuel in split amounts into each cylinder in multiple injection events in a cycle of the cylinder if it is determined that a combustion fluctuation is greater than a predetermined determination value during operation of the engine. The fuel injection controller increases a ratio of an injection amount of the first injection event in the split injection and lengthens an injection interval between the injection events as the combustion fluctuation increases. Thus, a wet amount of the injected fuel is reduced to expedite atomization of the injected fuel and to homogenize an in-cylinder mixture gas. As a result, the combustion state is improved.

13 Claims, 8 Drawing Sheets

INTA COMP EXPA EXHA (a) INJ
(b) INJ
(c) INJ
(d) INJ
(e) INJ
(f) INJ

ECU
30
27
26
28
25
40
38
11
22
32
24
39
31
37
23
33
20
21
18
19
EGR
34
16
15
17
43
12
PURGE
44
14
13
CANISTER
42
36
ACC.
35
41

START
S401
SPLIT INJECTION POSSIBLE?
NO
YES
S402
VEGR>K1?
NO
YES
S403
VOVER>K2?
NO
YES
S404
VPURGE>K3?
NO
YES
S405
P<K4?
NO
YES
S406
TW<K5?
NO
YES
S407
AIRFLOW CONTROL VALVE OPEN?
NO
YES
S409
SET SINGLE INJECTION MODE
SET SPLIT INJECTION MODE
S408
END

START
S501
SPLIT INJECTION POSSIBLE?
YES
NO
S502
EGR VALVE ABNORMAL?
YES
NO
S503
VALVE TIMING DEVICE ABNORMAL?
YES
NO
S504
PURGE CONTROL VALVE ABNORMAL?
YES
NO
S505
HIGH-PRESSURE FUEL SYSTEM ABNORMAL?
YES
NO
S506
AIRFLOW CONTROL VALVE ABNORMAL?
YES
NO
S507
SET SPLIT INJECTION MODE
S508
SET SINGLE INJECTION MODE
END

FUEL INJECTION CONTROLLER FOR IN-CYLINDER INJECTION ENGINE

CROSS REFERENCE TO RELATED APPLICATION

This application is based on and incorporates herein by reference Japanese Patent Application No. 2005-130999 filed on Apr. 28, 2005.

BACKGROUND OF THE INVENTION

1. Field of the Invention

The present invention relates to a fuel injection controller for an in-cylinder injection internal combustion engine that injects fuel directly into a cylinder.

2. Description of Related Art

In recent years, a demand for an in-cylinder injection engine (direct injection engine) having features of low fuel consumption, low exhaust emission and high output has increased rapidly. An in-cylinder injection engine, as described in JP patent No. 3186373, for example, performs a split injection for injecting fuel in split amounts into a cylinder in multiple injection events in an intake stroke during a low rotation period. Thus, even in a state in which an intake flow rate decreases during the low rotation period, an in-cylinder mixture gas, i.e., a mixing state of intake air and injected fuel in a cylinder, can be homogenized through the split injection.

A recent engine has an exhaust gas recirculation device for regulating an external EGR amount (amount of exhaust gas recirculated to an intake system), aiming to reduce emission, for example. If the external EGR amount is increased, the in-cylinder mixture gas tends to become heterogeneous and a combustion state tends to deteriorate. Therefore, a certain engine regulates swirl flow intensity in the cylinder with a swirl control valve to homogenize the in-cylinder mixture gas and to prevent the deterioration of the combustion state. A certain engine having the exhaust gas recirculation device and the swirl control valve reduces an exhaust gas recirculation rate, i.e., the external EGR amount, when the swirl control valve does not operate properly, as described in JP patent No. 2674445, for example.

Aiming at emission reduction and the like, a certain in-cylinder injection engine has an exhaust gas recirculation device for regulating the external EGR amount, a variable valve timing device for regulating an internal EGR amount (amount of combustion gas remaining in the cylinder) by changing a valve overlap amount, a fuel evaporative emission purge device for regulating a fuel evaporative emission purge amount (amount of fuel evaporative emission purged to the intake system) and the like. In this in-cylinder injection engine, if the external EGR amount, the internal EGR amount or the fuel evaporative emission purge amount increases, there is a possibility that the in-cylinder mixture gas becomes heterogeneous and the combustion state deteriorates, worsening drivability.

The technology described in JP patent No. 3186373 performs the split injection during the low rotation period of the in-cylinder injection engine in order to prevent the in-cylinder mixture gas from becoming heterogeneous because of the decrease in the intake flow rate during the low rotation period. However, the technology cannot improve the combustion state when the in-cylinder mixture gas becomes heterogeneous and the combustion state deteriorates due to the increase in the external EGR amount, the internal EGR amount or the fuel evaporative emission purge amount.

The technology described in JP patent No. 2674445 reduces the external EGR amount when the swirl control valve becomes abnormal. However, in the in-cylinder injection engine, the combustion state cannot be improved sufficiently by merely reducing the external EGR amount when the in-cylinder mixture gas becomes heterogeneous and the combustion state deteriorates due to the abnormality of the swirl control valve.

SUMMARY OF THE INVENTION

It is an object of the present invention to provide a fuel injection controller of an in-cylinder injection internal combustion engine capable of efficiently improving a combustion state of the engine and of finely achieving low emission and high drivability at the same time.

According to an aspect of the present invention, a fuel injection controller for an in-cylinder injection internal combustion engine that injects fuel directly into a cylinder has a combustion state determination device and a split injection control device. The combustion state determination device determines a combustion state of the engine. The split injection control device executes a split injection of injecting the fuel in split amounts into each cylinder in multiple injection events during a cycle of the cylinder if deterioration of the combustion state is sensed or predicted based on a determination result of the combustion state determination device. Through the split injection, a wet amount of the injected fuel (amount of fuel attached to an in-cylinder wall face, a piston and the like) is reduced to expedite atomization of the injected fuel. At the same time, an in-cylinder mixture gas, i.e., a mixing state of intake air and the injected fuel in the cylinder, is homogenized. Thus, the combustion state is improved. By performing the split injection when the deterioration of the combustion state is sensed or predicted, the combustion state can be efficiently improved by the split injection even in the case where the combustion state deteriorates due to the increase of the external EGR amount, for example. Thus, low emission and high drivability can be finely achieved at the same time.

According to another aspect of the present invention, the fuel injection controller determines the combustion state based on an operating state of at least one of an exhaust gas recirculation control device that controls an external exhaust gas recirculation amount, a variable valve device that changes a valve opening and closing characteristic of an intake valve and/or an exhaust valve, a purge control device that controls a fuel evaporative emission purge amount purged to the intake system and an airflow control device that controls an airflow generated in the cylinder. Thus, it can be accurately predicted whether the combustion state deteriorates.

According to another aspect of the present invention, the fuel injection controller determines the combustion state based on at least one of a fuel pressure sensed by a fuel pressure sensor and cooling water temperature sensed by a cooling water temperature sensor.

According to another aspect of the present invention, the fuel injection controller determines the combustion state by sensing information changing with the combustion state such as an in-cylinder pressure (fuel pressure), combustion ion current or an engine rotation speed fluctuation.

According to another aspect of the present invention, the fuel injection controller increases a ratio of an injection amount of a first injection event in the split injection as a deteriorating degree of the determined combustion state increases. The first injection event in the split injection has a relatively long fuel atomization period. Therefore, an atomization state of the injected fuel is improved, and the combustion state is surely improved.

According to another aspect of the present invention, the fuel injection controller lengthens an injection interval of the injection events in the split injection as the deteriorating degree of the determined combustion state increases. Thus, a subsequent injection event can be performed after the atomization of the fuel injected in the preceding injection event progresses to a certain degree. As a result, the atomization state of the injected fuel is improved.

According to another aspect of the present invention, the fuel injection controller increases the number of the injection events in the split injection as the deteriorating degree of the determined combustion state increases. Thus, a mixing effect of an in-cylinder mixture gas is improved, and the combustion state can be surely improved.

According to yet another aspect of the present invention, the fuel injection controller executes the split injection if it is determined that an abnormality exists in at least one of the exhaust gas recirculation control device, the variable valve device, the purge control device, the airflow control device and a high-pressure fuel system.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
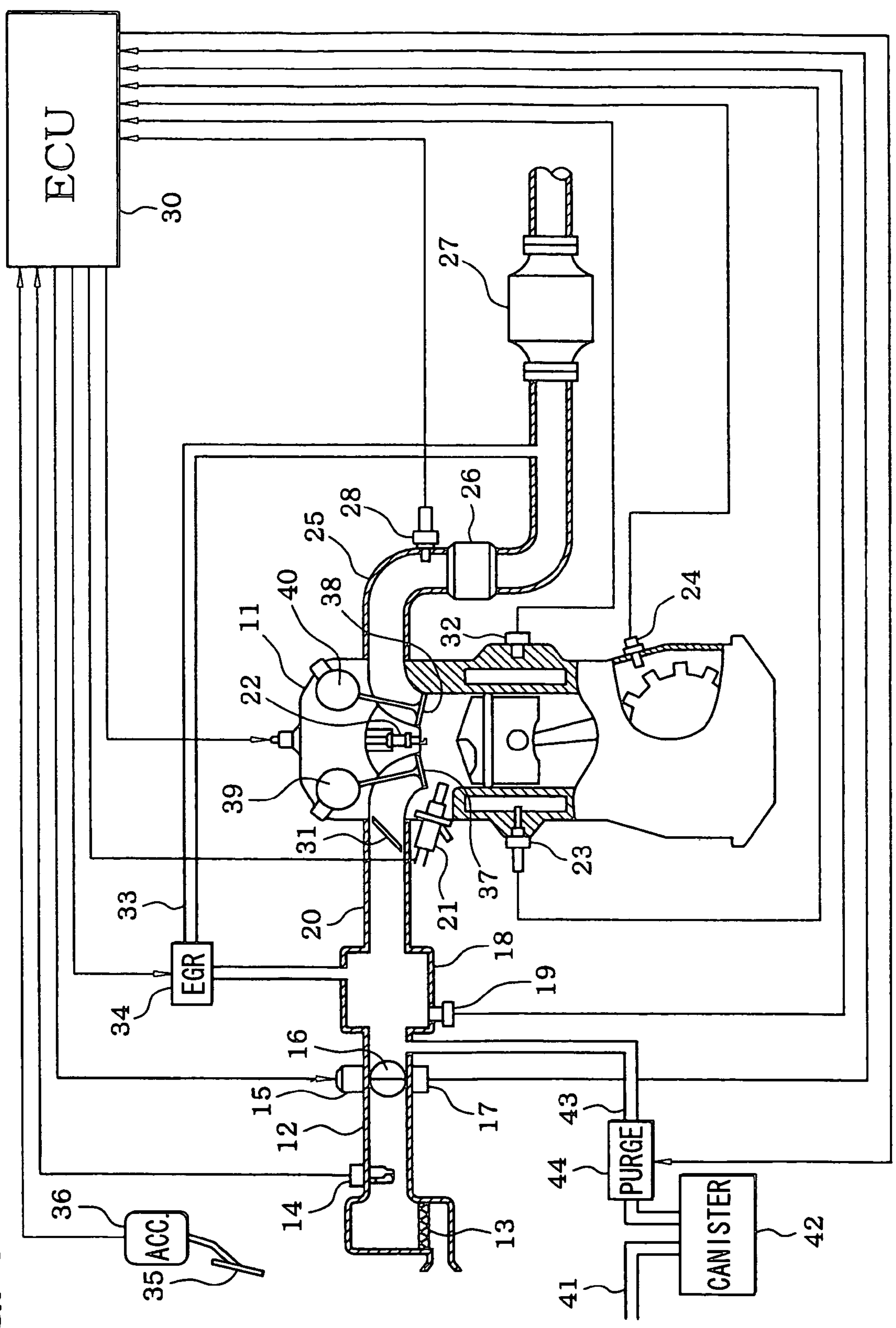
FIG. 1 is a schematic diagram showing an engine control system according to a first example embodiment of the present invention.

Referring to FIG. 1, an engine control system according to a first example embodiment of the present invention is illustrated. An air cleaner 13 is provided at the upstream-most portion of an intake pipe 12 of an in-cylinder injection internal combustion engine (in-cylinder injection engine) 11. An airflow meter 14 for measuring an intake air amount is provided downstream of the air cleaner 13. A throttle valve 16, the opening degree of which is regulated by a motor 15, and a throttle opening degree sensor 17 for measuring the opening degree of the throttle valve 16 (throttle opening degree) are provided downstream of the airflow meter 14.

A surge tank 18 is provided downstream of the throttle valve 16. An intake pipe pressure sensor 19 for measuring an intake pipe pressure is provided at the surge tank 18. The surge tank 18 is provided with an intake manifold 20 for introducing air into respective cylinders of the engine 11. Airflow control valves 31 of the respective cylinders are provided in the intake manifold 20. The control valve 31 controls airflow intensity (swirl flow intensity or tumble flow intensity) in the cylinder.

A fuel injection valve 21 is mounted to an upper portion of each cylinder of the engine 11 for injecting fuel directly into the cylinder. An ignition plug 22 is mounted for each cylinder in a cylinder head of the engine 11. The ignition plug 22 discharges a spark to ignite a mixture gas in the cylinder. An intake valve 37 and an exhaust valve 38 of the engine 11 respectively have variable valve timing devices 39, 40 for variably changing opening and closing timing of the intake valve 37 and the exhaust valve 38.

A knock sensor 32 for sensing a knocking and a cooling water temperature sensor 23 for measuring cooling water temperature are attached to a cylinder block of the engine 11. A crank angle sensor 24 for outputting a pulse signal every time a crankshaft (not shown) rotates by a predetermined crank angle is provided radially outside the crankshaft. A crank angle and engine rotation speed are measured based on the output signal of the crank angle sensor 24.

An upstream catalyst 26 and a downstream catalyst 27 for purifying exhaust gas are provided in an exhaust pipe 25 of the engine 11. An exhaust gas sensor 28 (air-fuel ratio sensor, oxygen sensor and the like) for sensing an air-fuel ratio, a rich/lean state and the like of the exhaust gas are provided upstream of the upstream catalyst 26. In the present embodiment, a three-way catalyst for purifying carbon monoxide, hydrocarbon, nitrogen oxides and the like in the exhaust gas near a theoretical air-fuel ratio is provided as the upstream catalyst 26. A nitrogen oxides occlusion reduction catalyst is provided as the downstream catalyst 27. The nitrogen oxides occlusion reduction catalyst 27 occludes the nitrogen oxides contained in the exhaust gas when the air-fuel ratio of the exhaust gas is lean. The nitrogen oxides occlusion reduction catalyst 27 reduces, purifies and discharges the occluded nitrogen oxides when the air-fuel ratio approaches the theoretical air-fuel ratio or becomes rich.

An EGR pipe 33 for recirculating part of the exhaust gas to an intake side is connected between the exhaust pipe 25 downstream of the upstream catalyst 26 and the surge tank 18 downstream of the throttle valve 16 in the intake pipe 12. An EGR valve 34 for controlling an external exhaust gas recirculation amount (external EGR amount) is provided in the EGR pipe 33. An accelerator sensor 36 measures a pressed amount (accelerator position) of an accelerator pedal 35.

Fuel evaporative emission generated through evaporation of the fuel in a fuel tank (not shown) is adsorbed by an adsorption body (not shown) such as activated carbon in a canister 42 through a communication pipe 41. A purge pipe 43 is connected between the canister 42 and the intake pipe 1 downstream of the throttle valve 16 for suctioning the vaporized fuel, which is adsorbed in the canister 42, into the intake pipe 12. A purge control valve 44 for regulating a fuel evaporative emission purge amount is provided in the purge pipe 43. The purge pipe 43 may be connected to the surge tank 18.

The outputs of the above-described various sensors are input to an engine control circuit (engine control unit: ECU) 30. The ECU 30 consists mainly of a microcomputer. The ECU 30 executes various engine control programs stored in an embedded ROM (storage medium). Thus, the ECU 30 controls a fuel injection amount of the fuel injection valve 21 and ignition timing of the ignition plug 22 in accordance with an engine operation state and controls the intake and exhaust variable valve timing devices 39, 40 to conform actual valve timing of the intake valve 37 and the exhaust valve 38 to target valve timing.

Figure 2:
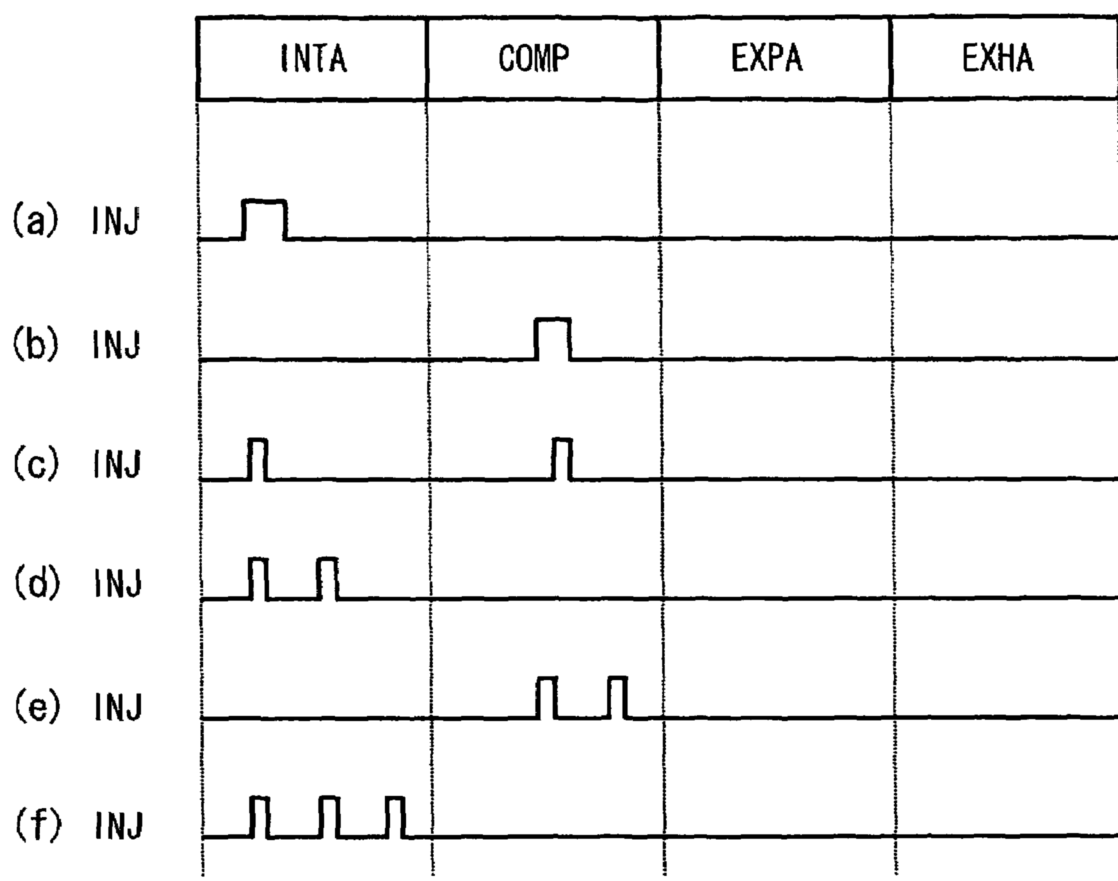
FIG. 2 is a diagram showing an injection pattern according to the FIG. 1 embodiment.

The ECU 30 switches between a stratified combustion mode and a homogeneous combustion mode in accordance with the engine operation state (engine rotation speed, required torque and the like). In the stratified combustion mode, as shown in a part (b) of FIG. 2, a small amount of fuel is injected directly into the cylinder in a compression stroke (COMP). A sign INJ in FIG. 2 indicates an injection pulse. Signs INTA, COMP, EXPA and EXHA in FIG. 2 respectively indicate an intake stroke, a compression stroke, an expansion stroke and an exhaustion stroke of each cylinder. Thus, a stratified mixture gas is formed near the ignition plug 22 to perform stratified combustion, improving fuel consumption. In the homogeneous combustion mode, as shown in a part (a) of FIG. 2, the fuel injection amount is increased and the fuel is injected directly into the cylinder in the intake stroke (INTA). Thus, a homogeneous mixture gas is formed to perform homogeneous combustion, increasing an engine output.

Figure 3:
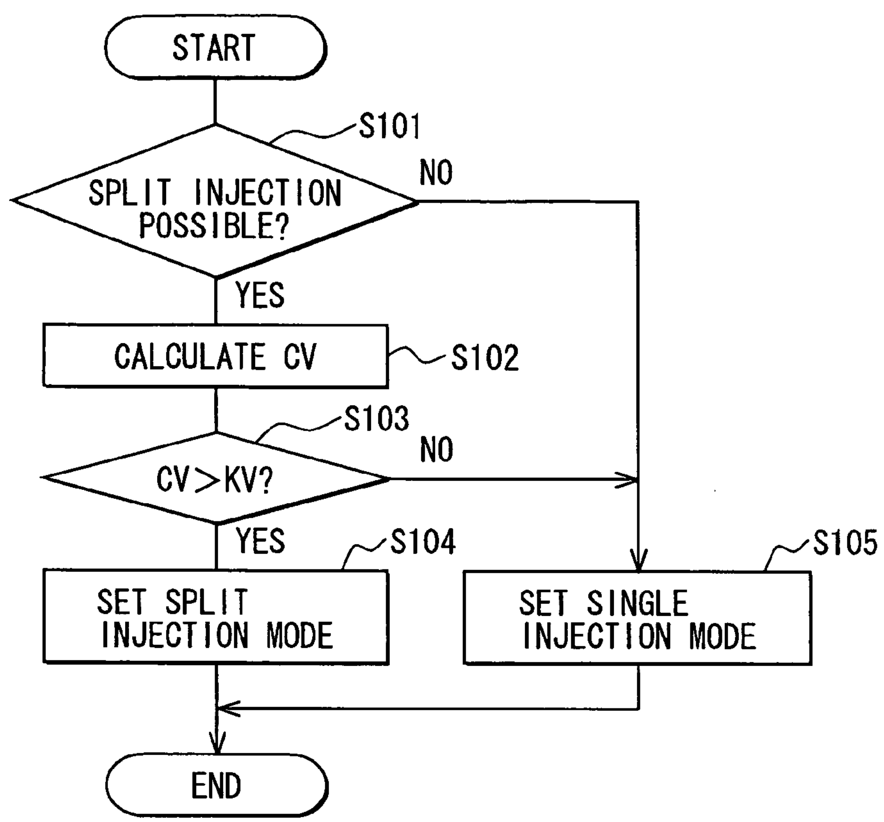
FIG. 3 is a flowchart showing processing of a split injection execution determination routine according to the FIG. 1 embodiment.
Figure 4:
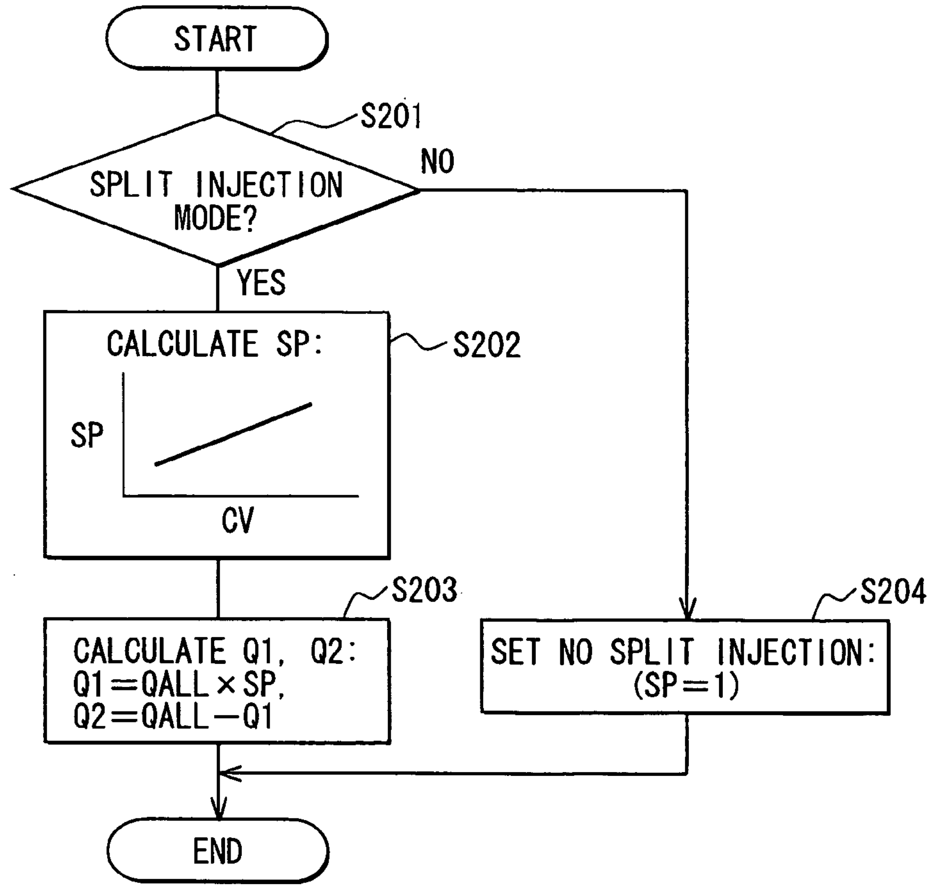
FIG. 4 is a flowchart showing processing of an injection amount calculation routine according to the FIG. 1 embodiment.
Figure 5:
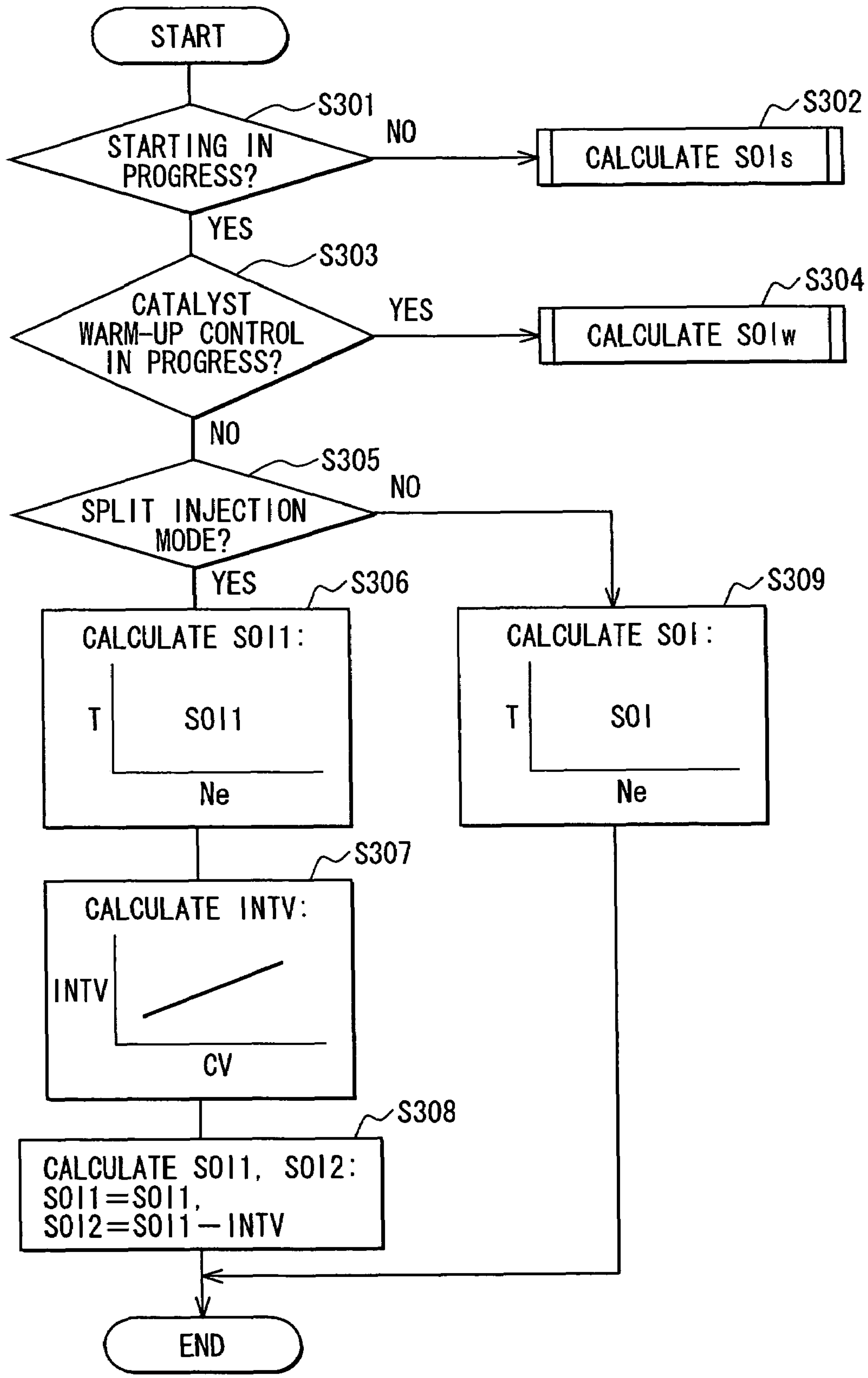
FIG. 5 is a flowchart showing processing of an injection timing calculation routine according to the FIG. 1 embodiment.

The ECU 30 executes split injection control routines shown in FIGS. 3 to 5. If it is determined that a combustion fluctuation (for example, a fluctuation of engine rotation speed) is larger than a predetermined determination value KV during an operation of the engine, then, the ECU 30 determines that the combustion state has deteriorated and performs a split injection for injecting the fuel in split amounts into each cylinder in multiple injection events during a cycle of the cylinder. The split injection expedites atomization of the injected fuel by reducing a wet amount of the injected fuel (fuel amount attaching to an in-cylinder wall surface or a piston) and homogenizes the in-cylinder mixture gas (mixing state of the intake air and the injected fuel in the cylinder), improving the combustion state.

An injection pattern of the split injection can be arbitrarily changed in accordance with the engine operation state, the combustion mode and the like. For example, the injection pattern is selected from injection patterns shown in parts (c) to (f) of FIG. 2. The injection pattern shown in the part (c) of FIG. 2 injects the fuel once in the intake stroke (INTA) and thereafter injects the fuel once in the compression stroke (COMP). The injection pattern shown in the part (d) of FIG. 2 injects the fuel twice in the intake stroke (INTA). The injection pattern shown in the part (e) of FIG. 2 injects the fuel twice in the compression stroke (COMP). The injection pattern shown in the part (f) of FIG. 2 injects the fuel three times in the intake stroke (INTA).

Next, processing of the routines for the split injection control executed by the ECU 30 will be explained in reference to FIGS. 3 to 5.

The ECU 30 executes the split injection execution determination routine shown in FIG. 3 in a predetermined cycle while a power source of the ECU 30 is on. If the routine is started, first, Step S101 determines whether the split injection is possible, for example, based on whether all of following conditions (1) to (3) are satisfied.

(1) The engine rotation speed Ne is within a predetermined range ($A<Ne<B$).

(2) The engine torque (engine load) T is within a predetermined range ($T1<T<T2$).

(3) The fuel injection valve 21 is normal.

The required fuel injection amount reduces in a low rotation speed range or a low torque range (low load range). If the split injection is executed in the low load range, an injection amount per each injection event becomes extremely small, and there is a possibility that stable injection cannot be ensured. In a high rotation speed range or a high torque range (high load range), an injection possible period of the engine 11 (period from valve closing timing of the exhaust valve 38 to the ignition timing) becomes extremely short. If the split injection is executed in the high load range, there is a possibility that the multiple injection events cannot be fully executed in the injection possible period. Therefore, the conditions (1) and (2) are set.

The split injection is determined to be possible if all the conditions (1) to (3) are satisfied. However, the split injection is determined to be impossible if any of the conditions (1) to (3) is not satisfied.

If Step S101 is YES, the process goes to Step S102. Step S102 calculates information about the combustion fluctuation CV, for example, the engine rotation fluctuation (fluctuation of the engine rotation speed Ne, which is measured by the crank angle sensor 24, per a predetermined period). Alternatively, a fluctuation of an in-cylinder pressure (combustion pressure), which is measured by a pressure sensor, per a predetermined period may be calculated as the information about the combustion fluctuation CV. Alternatively, combustion ion current may be measured through the ignition plug 22 and the like and the combustion fluctuation CV may be sensed based on a fluctuation of the measurement value of the combustion ion current.

Then, the process goes to Step S103, where it is determined whether the combustion state has deteriorated based on whether the combustion fluctuation CV is greater than a determination value KV.

If Step S103 is YES, it is determined that the combustion state has deteriorated, and the process goes to Step S104. Step S104 sets the demand injection mode at the split injection mode. Thus, the split injection for injecting the fuel in split amounts into each cylinder in multiple injection events in the intake stroke and/or the compression stroke of the cylinder is executed in accordance with the injection amount and the injection timing explained later.

If Step S103 is NO, it is determined that the combustion state is good and the process goes to Step S105. Step S105 sets the demand injection mode at a single injection mode. Thus, the normal single injection for injecting the fuel once in the intake stroke or the compression stroke is executed.

The ECU 30 executes the injection amount calculation routine shown in FIG. 4 in a predetermined cycle while the power source of the ECU 30 is on. If this routine is started, first, Step S201 determines whether the demand injection mode is the split injection mode. If Step S201 is YES, the process goes to Step S202. Step S202 calculates a split ratio SP corresponding to the combustion fluctuation CV (for example, the engine rotation speed fluctuation) in reference to a split ratio map shown in FIG. 6. The split ratio SP is a ratio of a fuel injection amount Q1 of a first injection event to a total fuel injection amount QALL of the split injection (summation of the fuel injection amount Q1 of the first injection event and a fuel injection amount Q2 of a second injection event in the case where the split injection performs two injection events).

Figure 6:
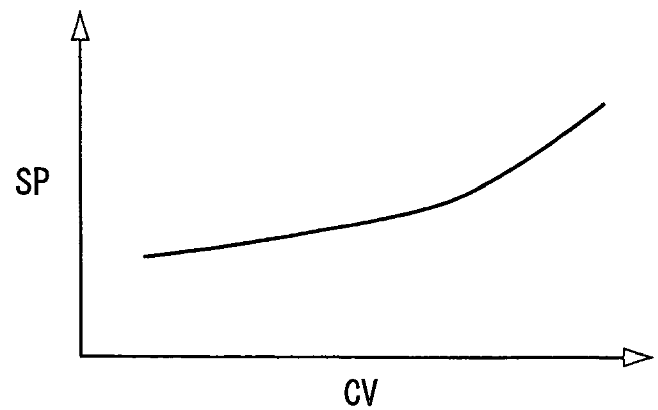
FIG. 6 is a diagram showing a split ratio map according to the FIG. 1 embodiment.

If the split ratio SP is increased, the fuel injection amount Q1 of the first injection event, the fuel atomization period of which from the fuel injection to the ignition is long, is increased and the fuel injection amount Q2 of the second injection event, the fuel atomization period of which is short, is reduced. Thus, the atomization state of the injected fuel can be improved. The split ratio map shown in FIG. 6 is set such that the split ratio SP increases as the combustion fluctuation CV (deterioration degree of the combustion state) increases. Accordingly, as the combustion fluctuation CV increases, the fuel injection amount Q1 of the first injection event, the fuel atomization period of which is long, is increased to improve the atomization state of the injected fuel.

After the split ratio SP is calculated, the process goes to Step S203. Step S203 calculates the first fuel injection amount Q1 by multiplying the total fuel injection amount QALL by the split ratio SP (Q1=QALL×SP). Step S203 calculates the second fuel injection amount Q2 by subtracting the first fuel injection amount Q1 from the total fuel injection amount QALL (Q2=QALL−Q1).

If Step S201 is NO, the process goes to Step S204. Step S204 sets no split injection (split ratio SP=1), and then, this routine ends.

The ECU 30 executes an injection timing calculation routine shown in FIG. 5 in a predetermined cycle while the power source of the ECU 30 is on. If this routine is started, first, Step S301 determines whether starting is in progress. If Step S301 is YES, the process goes to Step S302, where the injection timing SOIs for the starting period is set.

If Step S301 is NO, the process goes to Step S303, where it is determined whether catalyst early warm-up control is in progress. If Step S303 is YES, the process goes to Step S304, where the injection timing SOIw for the catalyst early warm-up control period is set.

If Step S303 is NO, the process goes to Step S305, where it is determined whether the demand injection mode is the split injection mode. If Step S305 is YES, the process goes to Step S306. Step S306 calculates first fuel injection timing SOI1 of the first injection event in accordance with the present engine operation state (for example, the engine rotation speed Ne and required torque T) in reference to a map of the first fuel injection timing SOI1.

Then, the process goes to Step S307. Step S307 calculates an injection interval INTV (injection interval between the first fuel injection timing SOI1 and second fuel injection timing SOI2 of the second injection event) in accordance with the combustion fluctuation CV (for example, engine rotation speed fluctuation) in reference to a map of the injection interval INTV shown in FIG. 7.

Figure 7:
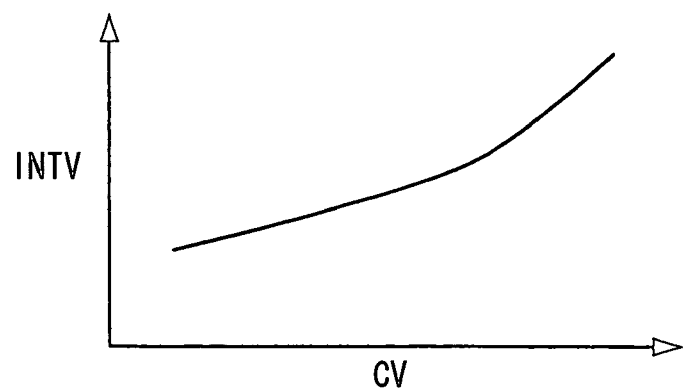
FIG. 7 is a diagram showing an injection interval map according to the FIG. 1 embodiment.

If the injection interval INTV is lengthened, a subsequent injection event can be performed after atomization of fuel injected in a preceding injection event progresses to a certain degree. Thus, the atomization state of the injected fuel can be improved. Therefore, the injection interval map shown in FIG. 7 is set such that the injection interval INTV lengthens as the combustion fluctuation CV (deteriorating degree of the combustion state) increases. Thus, as the combustion fluctuation CV increase, the injection interval INTV is lengthened such that the subsequent injection event is performed after the atomization of the fuel injected in the preceding injection event progresses to a certain degree. Thus, the atomization state of the injected fuel is improved.

After the injection interval INTV is calculated, the process goes to Step S308. Step S308 sets the fuel injection timing SOI1, which is calculated at Step S306, as the first fuel injection timing SOI1 without change (SOI1=SOI1). Step S308 sets the second fuel injection timing SOI2 at timing later than the first fuel injection timing SOI1 by the injection interval INTV (SOI2=SOI1−INTV).

If Step S305 is NO, that is, if it is determined that the demand injection mode is set at the single injection mode, the process goes to Step S309. Step S309 calculates fuel injection timing SOI of a normal period in accordance with the present operation state of the engine 11 (for example, the engine rotation speed Ne and the required torque T) in reference to a map of the fuel injection timing SOI of the normal period.

In the present embodiment, if it is determined that the combustion fluctuation CV (for example, the engine rotation speed fluctuation) is greater than the determination value KV, it is determined that the combustion state has deteriorated, and the split injection is performed. Therefore, even in the case where the combustion state is deteriorated by the increase of the external EGR amount, the internal EGR amount, the fuel evaporative emission purge amount or the like, the combustion state can be efficiently improved by the split injection. Thus, low emission and high drivability can be finely achieved at the same time.

In the present embodiment, as the combustion fluctuation CV increases, the split ratio SP of the split injection is increased and the injection interval INTV is lengthened. Therefore, as the combustion fluctuation CV (deteriorating degree of the combustion state) increases, the fuel injection amount of the first injection event, the atomization period of which is long, is increased and the subsequent fuel injection event is performed after the atomization of the fuel injected in the first injection event progresses to a certain degree. Thus, the atomization state of the injected fuel can be improved and the combustion state can be surely improved.

Figure 8:
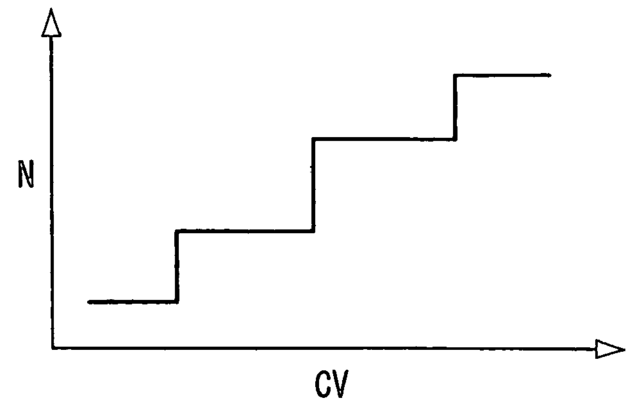
FIG. 8 is a diagram showing an injection number map according to a modified example of the FIG. 1 embodiment.

The number N of the injection events in the split injection may be a fixed value. Alternatively, the injection number N may be calculated in reference to a map of the injection number N shown in FIG. 8 such that the injection number N increases as the combustion fluctuation CV increases. Thus, a mixing effect of the in-cylinder mixture gas can be increased and the combustion state can be surely improved.

Next, split injection control according to a second example embodiment will be explained with reference to FIGS. 9 to 12.

Figure 10:
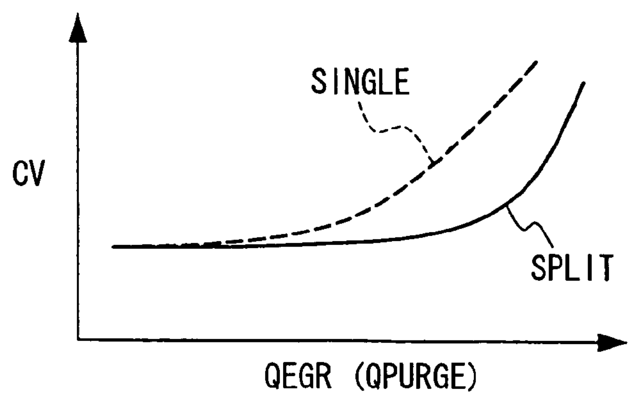
FIG. 10 is a characteristic diagram showing a relation between an EGR amount and a combustion fluctuation.
Figure 11:
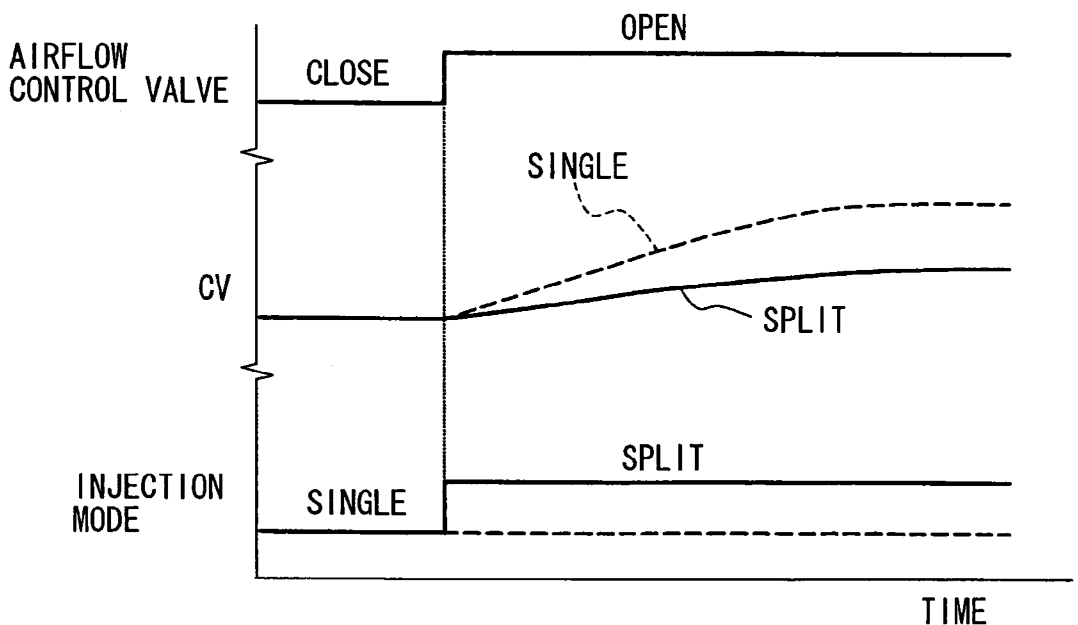
FIG. 11 is a time chart showing a behavior of the combustion fluctuation when an airflow control valve opens.

If a valve overlap amount (period in which both of the intake valve 37 and the exhaust valve 38 are open) is changed with the variable valve timing devices 39, 40, the internal EGR amount (amount of combustion gas remaining in the cylinder) changes. As shown in FIG. 10, the in-cylinder mixture gas tends to become heterogeneous and the combustion fluctuation CV (deteriorating degree of the combustion state) tends to increase if the internal EGR amount QEGR, which changes in accordance with the operation states of the variable valve timing devices 39, 40, the external EGR amount QEGR, which changes in accordance with the operation state of the EGR valve 34, or the fuel evaporative emission purge amount QPURGE, which changes in accordance with the operation state of the purge control valve 44, increases. In FIG. 10, a solid line SPLIT corresponds to the split injection and a broken line SINGLE corresponds to the single injection. If the airflow control valve 31 is opened, the airflow intensity inside the cylinder decreases, so that the in-cylinder mixture gas tends to become heterogeneous and the combustion fluctuation CV tends to increase as shown in FIG. 11. Therefore, by determining the combustion state based on the operating state of the EGR valve 34, the variable valve timing devices 39, 40, the purge control valve 44, or the airflow control valve 31, it can be determined accurately whether the combustion state deteriorates.

Figure 12:
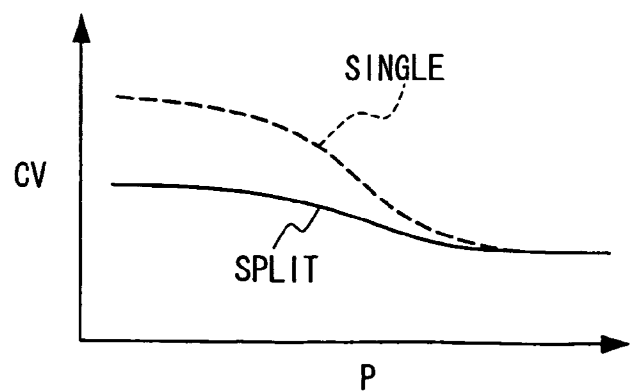
FIG. 12 is a characteristic diagram showing a relation between a fuel pressure and the combustion fluctuation.

As shown in FIG. 12, if the fuel pressure P decreases, the atomization state of the injected fuel tends to deteriorate and the combustion fluctuation CV tends to increase. If the engine temperature decreases, the wet amount of the injected fuel tends to increase and the combustion fluctuation CV tends to increase. Therefore, by determining the combustion state based on the fuel pressure P sensed by a fuel pressure sensor (not shown) or the cooling water temperature (substitute information of the engine temperature) sensed by the cooling water temperature sensor 23, it is accurately determined whether the combustion state deteriorates.

Figure 9:
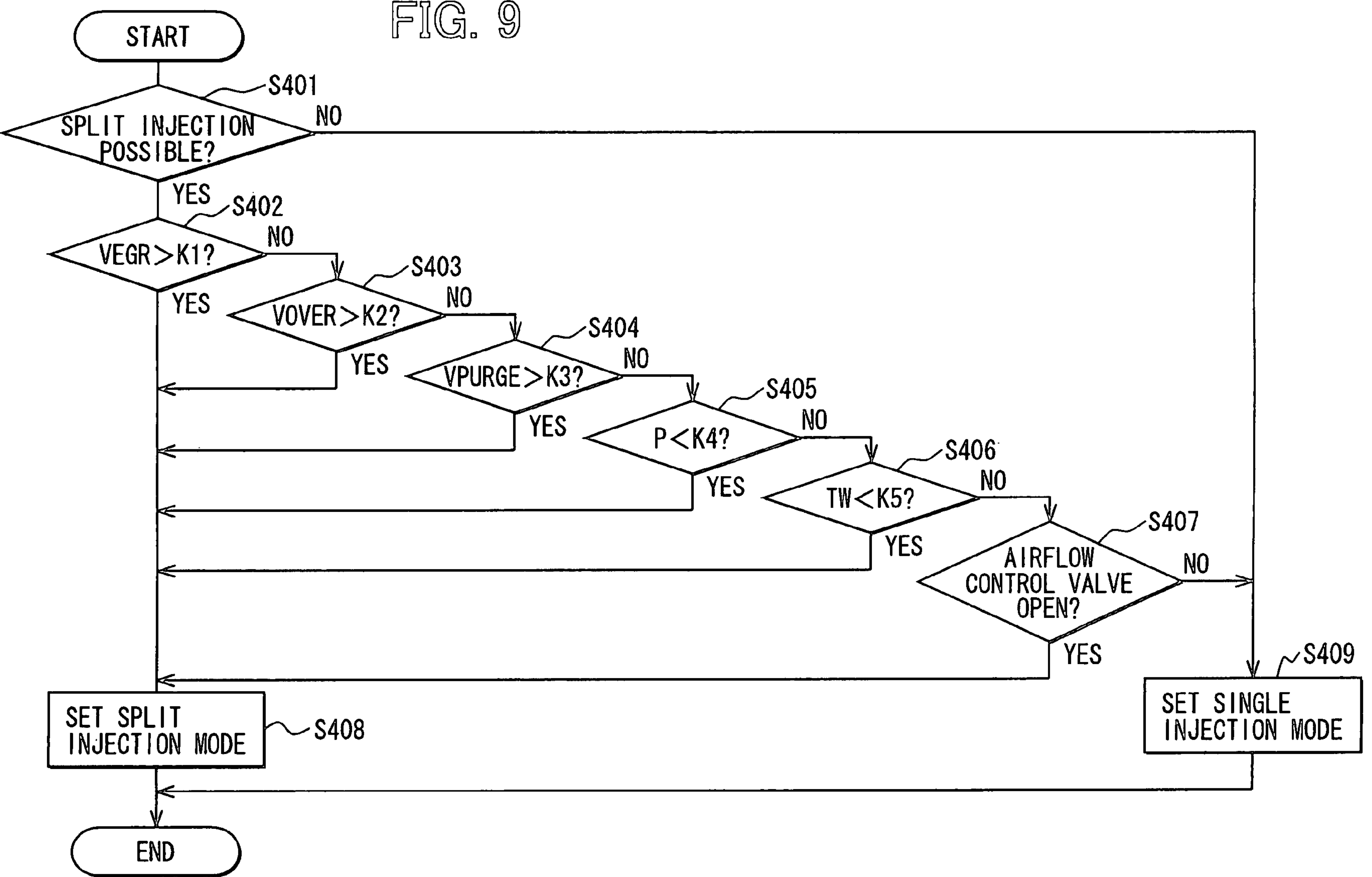
FIG. 9 is a flowchart showing processing of a split injection execution determination routine according to a second example embodiment of the present invention.

Therefore, in the present embodiment, the ECU 30 executes the split injection execution determination routine shown in FIG. 9. Thus, the ECU 30 determines whether the combustion state deteriorates based on the operating state of the EGR valve 34, the variable valve timing devices 39, 40, the purge control valve 44 or the airflow control valve 31 or based on the fuel pressure or the cooling water temperature. If it is determined that the combustion state deteriorates, the split injection is executed to improve the combustion state.

In the split injection execution determination routine shown in FIG. 9, first, Step S401 determines whether the split injection is possible. If Step S401 is YES, it is determined whether the combustion state deteriorates at Steps S402 to S407.

Step S402 determines whether the external EGR amount exceeds a determination value and the combustion fluctuation exceeds an allowable level based on whether the opening degree VEGR of the EGR valve 34 is greater than a determination value K1.

Step S403 determines whether the internal EGR amount exceeds a determination value and the combustion fluctuation exceeds the allowable level based on whether the valve overlap amount VOVER corresponding to the operation amounts of the variable valve timing devices 39, 40 is greater than a determination value K2.

Step S404 determines whether the fuel evaporative emission purge amount exceeds a determination value and the combustion fluctuation exceeds the allowable level based on whether the opening degree VPURGE of the purge control valve 44 is greater than a determination value K3.

Step S405 determines whether the combustion fluctuation exceeds the allowable level based on whether the fuel pressure P sensed by the fuel pressure sensor is less than a determination value K4.

Step S406 determines whether the combustion fluctuation exceeds the allowable level based on whether the cooling water temperature TW sensed by the cooling water temperature sensor 23 is lower than a determination value K5.

Step S407 determines whether the combustion fluctuation exceeds the allowable level based on whether the airflow control valve 31 is open.

If at least one of Steps S402 to S407 is YES, it is determined that the combustion state deteriorates, and the process goes to Step S408. Step S408 sets the demand injection mode at the split injection mode. Thus, the split injection for injecting the fuel in split amounts into each cylinder in multiple injection events in the intake stroke and/or the compression stroke of the cylinder is executed.

If all of Steps S402 to S407 are NO, it is determined that the combustion state is good, and the process goes to Step S409. Step S409 sets the demand injection mode at the single injection mode. Thus, the normal single injection for injecting the fuel once in the intake stroke or the compression stroke is executed.

In the present embodiment, it is determined whether the combustion state deteriorates based on the operating state of the EGR valve 34, the variable valve timing devices 39, 40, the purge control valve 44, or the airflow control valve 31 or based on the fuel pressure P or the cooling water temperature TW. The split injection is executed if it is determine that the combustion state deteriorates. Therefore, the combustion state can be efficiently improved by the split injection in any cases where the combustion state deteriorates due to the increase in the external EGR amount, the internal EGR amount or the fuel evaporative emission purge amount, where the combustion state deteriorates because the airflow control valve 31 is opened, and where the combustion state deteriorates due to the decrease in the fuel pressure P or the engine temperature TW.

Next, split injection control according to a third example embodiment of the present invention will be explained with reference to FIG. 13.

If the EGR valve 34, either one of the variable valve timing devices 39, 40, the purge control valve 44, the airflow control valve 31 or a high-pressure fuel system (high-pressure fuel pump, for example) fails and becomes unable to operate properly, there is a possibility that the external EGR amount, the internal EGR amount, the fuel evaporative emission purge amount, the airflow intensity, the fuel pressure or the like cannot be controlled to an appropriate value corresponding to the engine operation state and the like and the combustion state deteriorates.

Therefore, in the present embodiment, the ECU 30 executes various abnormality diagnosis routines (not shown) to function as an abnormality diagnosis devise. Thus, the ECU 30 diagnoses existence or nonexistence of an abnormality in the EGR valve 34, the variable valve timing devices 39, 40, the purge control valve 44, the high-pressure fuel system or the airflow control valve 31. The ECU 30 executes a split injection execution determination routine shown in FIG. 13. Thus, the ECU executes the split injection to improve the combustion state when it is determined that an abnormality exists in at least one of the EGR valve 34, the variable valve timing devices 39, 40, the purge control valve 44, the high-pressure fuel system and the airflow control valve 31.

Figure 13:
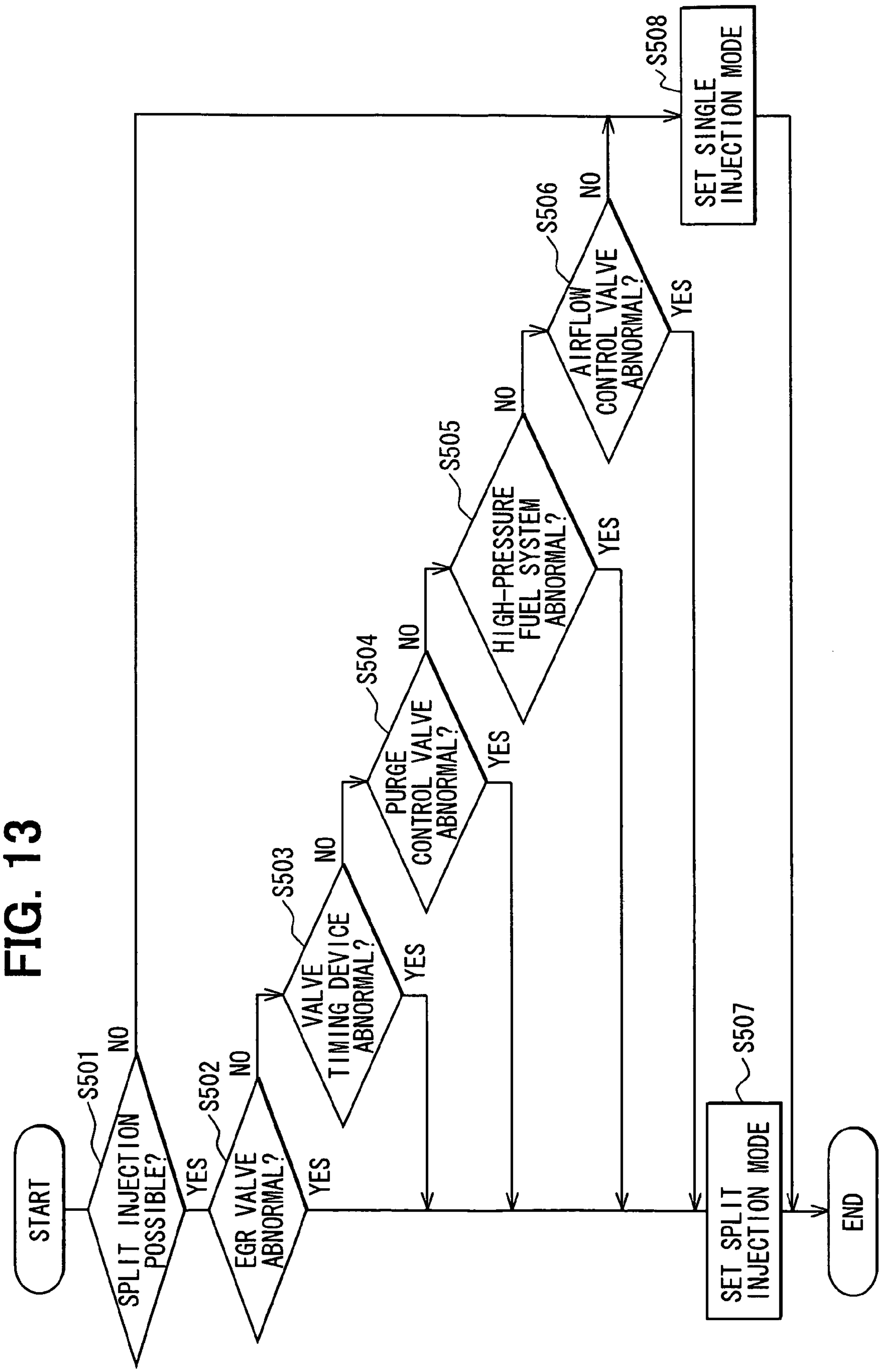
FIG. 13 is a flowchart showing processing of a split injection execution determination routine according to a third example embodiment of the present invention.

In the split injection execution determination routine shown in FIG. 13, first, Step S501 determines whether the split injection is possible. If Step S501 is YES, it is determined whether an abnormality is determined to be present in the EGR valve 34, the variable valve timing devices 39, 40, the purge control valve 44, the high-pressure fuel system or the airflow control valve 31 at Steps S502 to S506.

If at least one of Steps S502 to S506 is YES, that is, if it is determined that an abnormality exists in at least one of the EGR valve 34, the variable valve timing devices 39, 40, the purge control valve 44, the high-pressure fuel system and the airflow control valve 31, it is determined that there is a possibility that the combustion state deteriorates, and the process goes to Step S507. Step S507 sets the demand injection mode at the split injection mode. Thus, the split injection for injecting the fuel in split amounts into each cylinder in multiple injection events in the intake stroke and/or the compression stroke of the cylinder is executed.

If all Steps S502 to S506 are NO, that is, if it is determined that all of the EGR valve 34, the variable valve timing devices 39, 40, the purge control valve 44, the high-pressure fuel system and the airflow control valve 31 are normal (free of abnormality), the process goes to Step S508. Step S508 sets the demand injection mode at the single injection mode. Thus, the normal single injection for injecting the fuel once in the intake stroke or the compression stroke is executed.

In the present embodiment, the split injection is executed if it is determined that an abnormality exists in at least one of the EGR valve 34, the variable valve timing devices 39, 40, the purge control valve 44, the high-pressure fuel system, and the airflow control valve 31. Thus, the combustion state can be improved by the split injection even under a condition in which the combustion state deteriorates due to an abnormality in the EGR valve 34, the variable valve timing devices 39, 40, the purge control valve 44, the high-pressure fuel system or the airflow control valve 31.

In the case of a valve-opening fixation abnormality of the EGR valve 34, the purge control valve 44, or the airflow control valve 31, it may be determined that the combustion state deteriorates and the split injection may be executed. In the case of a valve-closing fixation abnormality of the EGR valve 34, the purge control valve 44, or the airflow control valve 31, it may be determined that the combustion state does not deteriorate and the single injection may be executed without executing the split injection.

The present invention should not be limited to the disclosed embodiments, but may be implemented in many other ways without departing from the spirit of the invention.

What is claimed is:

1. A fuel injection controller for an in-cylinder injection internal combustion engine that injects fuel directly into a cylinder, the fuel injection controller comprising:

a combustion state determination device that determines a combustion state of the engine; and a split injection control device that executes a split injection for injecting the fuel in split amounts into each cylinder in multiple injection events in a cycle of the cylinder if deterioration of the combustion state is sensed or predicted based on a determination result of the combustion state determination device, wherein the split amounts of the fuel are calculated by dividing a total fuel injection amount to be injected in the cylinder during one cycle.

2. The fuel injection controller as in claim 1, further comprising:

at least one of an exhaust gas recirculation control device that controls an external exhaust gas recirculation amount recirculated from an exhaust system to an intake system, a variable valve device that changes a valve opening and closing characteristic of an intake valve and/or an exhaust valve, a purge control device that controls a fuel evaporative emission purge amount purged to the intake system and an airflow control device that controls an airflow generated in the cylinder, wherein the combustion state determination device determines the combustion state based on an operation state of at least one of the exhaust gas recirculation control device, the variable valve device, the purge control device and the airflow control device.

3. The fuel injection controller as in claim 1, further comprising:

at least one of a fuel pressure sensor that senses a fuel pressure of the engine and a cooling water temperature sensor that senses cooling water temperature of the engine, wherein the combustion state determination device determines the combustion state based on at least one of the fuel pressure sensed by the fuel pressure sensor and the cooling water temperature sensed by the cooling water temperature sensor.

4. The fuel injection controller as in claim 1, wherein the combustion state determination device determines the combustion state by sensing information that changes in accordance with the combustion state.

5. The fuel injection controller as in claim 4, wherein the information that changes in accordance with the combustion state is a pressure in the cylinder, combustion ion current, or a fluctuation of rotation speed of the engine.

6. The fuel injection controller as in claim 1, wherein the split injection control device increases a ratio of an injection amount of a first injection event in the split injection as a deteriorating degree of the combustion state determined by the combustion state determination device increases.

7. The fuel injection controller as in claim 1, wherein the split injection control device lengthens an injection interval between the injection events in the split injection as a deteriorating degree of the combustion state determined by the combustion state determination device increases.

8. The fuel injection controller as in claim 1, wherein the split injection control device increases the number of the injection events in the split injection as a deteriorating degree of the combustion state determined by the combustion state determination device increases.

9. A fuel injection controller for an in-cylinder injection internal combustion engine that injects fuel directly into a cylinder, the fuel injection controller comprising:

an abnormality diagnosis device that diagnoses existence or nonexistence of an abnormality in at least one of an exhaust gas recirculation control device for controlling an external exhaust gas recirculation amount recirculated from an exhaust system to an intake system, a variable valve device for changing a valve opening and closing characteristic of an intake valve and/or an exhaust valve, a purge control device for controlling a fuel evaporative emission purge amount purged to the intake system, an airflow control device for controlling an airflow generated in the cylinder, and a high-pressure fuel system; and a split injection control device that executes a split injection for injecting the fuel in split amounts into each cylinder in multiple injection events in a cycle of the cylinder if the abnormality diagnosis device determines that an abnormality exists in at least one of the exhaust gas recirculation control device, the variable valve device, the purge control device, the airflow control device and the high-pressure fuel system, wherein the split amounts of the fuel are calculated by dividing a total fuel injection amount to be injected in the cylinder during one cycle.

10. An in-cylinder injection internal combustion engine comprising:

an ignition plug for discharging a spark to ignite a mixture gas in a cylinder of the engine;

a fuel injection controller for controlling a fuel injector to inject fuel directly into the cylinder, the fuel injection controller comprising:

a combustion state determination device that determines a combustion state of the engine; and a split injection controller that executes a split injection for injecting the fuel in split amounts into each cylinder in multiple injection events in a cycle of the cylinder if deterioration of the combustion state is sensed or predicted based on a determination result of the combustion state determination device, wherein the split amounts of the fuel are calculated by dividing a total fuel injection amount to be injected in the cylinder during one cycle.

11. An engine control system comprising:

an ignition timing controller for controlling an ignition timing of an ignition plug to ignite a mixture gas in a cylinder of an in-cylinder injection internal combustion engine by discharging a spark;

a fuel injection controller for controlling direct fuel injection into the cylinder, the fuel injection controller comprising:

a combustion state determination device that determines a combustion state of the engine; and a split injection controller that executes a split injection for injecting the fuel in split amounts into each cylinder in multiple injection events in a cycle of the cylinder if deterioration of the combustion state is sensed or predicted based on a determination result of the combustion state determination device, wherein the split amounts of the fuel are calculated by dividing a total fuel injection amount to be injected in the cylinder during one cycle.

12. An in-cylinder injection internal combustion engine comprising:

an ignition plug for discharging a spark to ignite a mixture gas in a cylinder of the engine;

a fuel injection controller for controlling a fuel injector to inject fuel directly into the cylinder, the fuel injection controller comprising:

an abnormality diagnosis device that diagnoses existence or nonexistence of an abnormality in one or more of an exhaust gas recirculation controller for controlling an external exhaust gas recirculation amount recirculated from an exhaust system to an intake system, a variable valve device for changing a valve opening and closing characteristic of an intake valve and/or an exhaust valve, a purge controller for controlling a fuel evaporative emission purge amount purged to the intake system, an airflow controller for controlling an airflow generated in the cylinder, and a high-pressure fuel system; and a split injection controller that executes a split injection for injecting the fuel in split amounts into each cylinder in multiple injection events in a cycle of the cylinder if the abnormality diagnosis device determines that an abnormality exists in one or more of the exhaust gas recirculation controller, the variable valve device, the purge controller, the airflow controller and the high-pressure fuel system, wherein the split amounts of the fuel are calculated by dividing a total fuel injection amount to be injected in the cylinder during one cycle.

13. An engine control system comprising:

an ignition timing controller for controlling an ignition timing of an ignition plug to ignite a mixture gas in a cylinder of an in-cylinder injection internal combustion engine by discharging a spark;

a fuel injection controller for controlling direct fuel injection into the cylinder, the fuel injection controller comprising:

an abnormality diagnosis device that diagnoses existence or nonexistence of an abnormality in one or more of an exhaust gas recirculation controller for controlling an external exhaust gas recirculation amount recirculated from an exhaust system to an intake system, a variable valve device for changing a valve opening and closing characteristic of an intake valve and/or an exhaust valve, a purge controller for controlling a fuel evaporative emission purge amount purged to the intake system, an airflow controller for controlling an airflow generated in the cylinder, and a high-pressure fuel system; and a split injection controller that executes a split injection for injecting the fuel in split amounts into each cylinder in multiple injection events in a cycle of the cylinder if the abnormality diagnosis device determines that an abnormality exists in one or more of the exhaust gas recirculation controller, the variable valve device, the purge controller, the airflow controller and the high-pressure fuel system, wherein the split amounts of the fuel are calculated by dividing a total fuel injection amount to be injected in the cylinder during one cycle.

* * * * *